United States Patent [19]
Hughes et al.
[11] 4,237,028
[45] Dec. 2, 1980

[54] APPARATUS FOR PRODUCING EMULSIONS

[75] Inventors: John F. Hughes, Southampton; John M. C. Roberts, Camberly, both of England

[73] Assignee: National Research Development Corporation, London, England

[21] Appl. No.: 937,844

[22] Filed: Aug. 29, 1978

[30] Foreign Application Priority Data

Sep. 8, 1977 [GB] United Kingdom ............... 37556/77

[51] Int. Cl.[3] .......................... B05B 5/02; B01F 3/08; B01J 13/00

[52] U.S. Cl. ............................. 252/359 B; 252/311.5; 252/314

[58] Field of Search .............. 252/314, 359 B; 427/27, 427/28, 30; 118/626

[56] References Cited

U.S. PATENT DOCUMENTS

| | | | |
|---|---|---|---|
| 2,723,646 | 11/1955 | Ransburg | 427/30 X |
| 2,777,784 | 1/1957 | Miller | 427/30 |
| 2,893,893 | 7/1959 | Crouse | 427/28 |
| 3,118,843 | 1/1964 | Stuetzer | 252/314 X |
| 3,129,112 | 4/1964 | Marvin | 427/27 |

FOREIGN PATENT DOCUMENTS 461772 2/1937 United Kingdom ..................... 252/314

OTHER PUBLICATIONS

Nawab et al., "The Preparation of Uniform Emulsions by Electrical Dispersion," J. Colloid Science, 13, pp. 179-187 (1958).

*Primary Examiner*—Richard D. Lovering
*Attorney, Agent, or Firm*—Cushman, Darby & Cushman

[57] ABSTRACT

An emulsion of a disperse phase liquid in a continuous phase liquid is produced by atomizing the disperse phase liquid electrostatically and entraining the atomized droplets in a moving layer of continuous phase liquid. To produce a spray with atomized droplets of small and uniform size a disperse phase liquid, such as wax in a solvent, is directed to flow over the sharp edge of a blade maintained at a high voltage with respect to the conductive surface of the drum. The drum is rotated so that the surface is wetted by a reservoir of continuous phase liquid and so that the surface layer of liquid intercepts the spray of droplets at a uniform rate to produce an emulsion of consistent concentration. The concentration is controlled by setting the rates of flow and the number of cycles of interception.

15 Claims, 4 Drawing Figures

APPARATUS FOR PRODUCING EMULSIONS

The invention relates to a method and apparatus for producing emulsions.

In a typical wax/water emulsion such as a polish the wax in a suitable solvent is dispersed in finely divided state through the water; thus the wax is referred to as the disperse phase and the water as the continuous phase. Conventionally emulsions are produced by mixing the phases by mechanical means which cause the disperse phase material to divide under shear stress. The result is often to produce an unstable emulsion the behavior of which is attributed to the pressure of a broad spectrum of particle size in the disperse phase. It is generally considered that stability in an emulsion depends on the production of disperse particles which are both small and uniform in size. The ideal range of diameter is limited to a few μm whereas commonly although many particles may be within this range others are likely to be very much larger.

It is an object of the invention to provide means for producing emulsions in which the range of particles size and the uniformity of distribution of particles in the continuous phase is improved.

According to a first aspect of the invention apparatus for producing an emulsion of a disperse phase material in a continuous phase material, the materials being provided in fluid form, comprises atomiser electrode means, means enabling the electrode means to receive a flow of the disperse phase material, carrier means providing an electrically conductive surface spaced apart from the electrode means and coating means enabling the conductive surface to receive a coating of the continuous phase material, the electrode means being effective when raised to a suitable electric potential relative to the conductive surface to cause the formation of atomised droplets of the disperse phase material and the carrier means being so arranged and disposed that the coating of continuous phase material is progressively advanced in a path such that the droplets are entrained by the coating.

The size of the droplets is affected by liquid conductivity and viscosity, the rate of flow of the disperse phase material and/or the intensity of the electric field. The latter two parameters may be selected to provide a predetermined particle size during atomisation.

The rate of flow of the disperse phase material and the rate of transport of the continuous phase material may be selected to provide a predetermined concentration in the emulsion.

The emulsion concentration may be increased by recirculation of the continuous phase material on the carrier surface.

The atomiser electrode preferably comprises a sharp edge blade having the edge parallel to the carrier surface perpendicular to the direction of motion of the continuous phase material, and a guard electrode adjacent to each end of the blade.

The carrier means may comprise a generally planar stationary surface inclined so as to cause the continuous phase material to advance at a selected rate; the surface may further be provided with channels in the direction of flow.

Another form of carrier means may comprise the external surface of a rotatable cylinder arranged to receive a coating of continuous phase material by partial peripheral immersion in a reservoir, the rate of advance of the coating being substantially determined by the rate of rotation of the cylinder.

A further form of carrier means may comprise the internal surface of a rotatable hollow cylinder, a reservoir being maintained by gravity in the lower portion of the interior of the cylinder. The atomiser electrode in such an arrangement must also be disposed inside the cylinder.

According to a second aspect of the invention there is provided a method for producing an emulsion of a disperse phase material in a continuous phase material, the materials being provided in fluid form, comprising the operations of subjecting the surface of a layer of the disperse phase material to an electrostatic field of such intensity that atomised droplets of the material are ejected from the surface towards an electrically conductive surface and progressively advancing a coating of the continuous phase material in contact with the conductive surface in a path such that the droplets are entrained by the coating.

The invention thus lies in the realisation that the production of an emulsion is more fully controllable if the disperse phase liquid is atomised before distribution in the continuous phase, and if the atomised droplets are produced by subjecting the liquid surface to a strong electrostatic field. A very finely divided and uniform state is thus achieved. In order that the distribution shall be as uniform as possible it is a further condition that the continuous phase is exposed to the atomised material in the form of a thin moving layer.

In order to make clear how the benefits of the invention may be realised embodiments of the invention will be described with reference to the accompanying drawings in which:

FIG. 1(*b*) represents diagrammatically a component of the apparatus of FIG. 1(*a*);

Figure 1A:
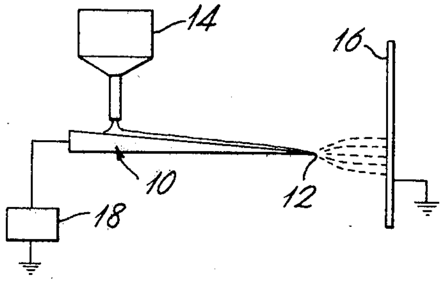
FIG. 1(*a*) represents schematically an apparatus for atomising a liquid in a strong electric field.
Figure 1B:
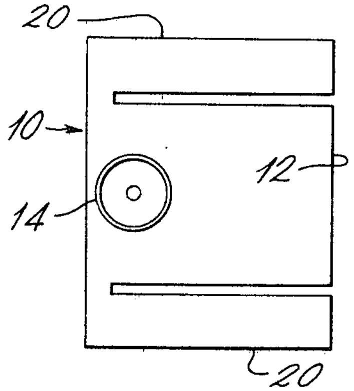

FIGS. 1*a* and 1*b* relate only to the atomisation process. In FIG. 1*a* a blade 10, from the sharp edge 12 of which atomisation is to occur, is mounted in a generally horizontal position. The upper surface is slightly inclined towards the edge 12 so that a flow of liquid is maintained from a reservoir 14 mounted above the blade 10. The edge 12 has a very small radius of curvature in the order of a few μm and is held at a high negative or positive potential with respect to a plate 16 at earth potential by means of a power supply 18. It is well known that under the influence of the electric field at the edge 12, the liquid at the edge becomes charged and is attracted towards the plate 16. Cusps are formed in the liquid at which the electric field becomes progressively more intense until charged droplets break away and travel to the plate 16. It will be clear that the process fails if charged droplets are collected on an electrically isolated surface since an opposing charge then accumulates to repel the droplets. Because the formation of droplets occurs most readily where the field is most intense, the whole length of the edge 12 of the blade 10 must be uniformly sharp to provide uniformly distributed atomisation. At the ends of the blade 10, as is indicated in plan view in FIG. 1*b*, guard electrodes 20 are also provided to avoid a concentration of field at the corners. Electrodes 20 are maintained at the same potential as blade 10 do not receive a flow of liquid from reservoir 14. In view of the dependence of the conditions of atomisation on the strength of the local field and on the conductivity and viscosity of the liquid no indication of specific values of parameters would be generally useful. The liquid properties are of course also dependent on temperature. It is established however that for a given liquid the droplet size is reduced as the applied voltage is increased or as the rate of liquid flow is reduced with a constant voltage.

Figure 2:
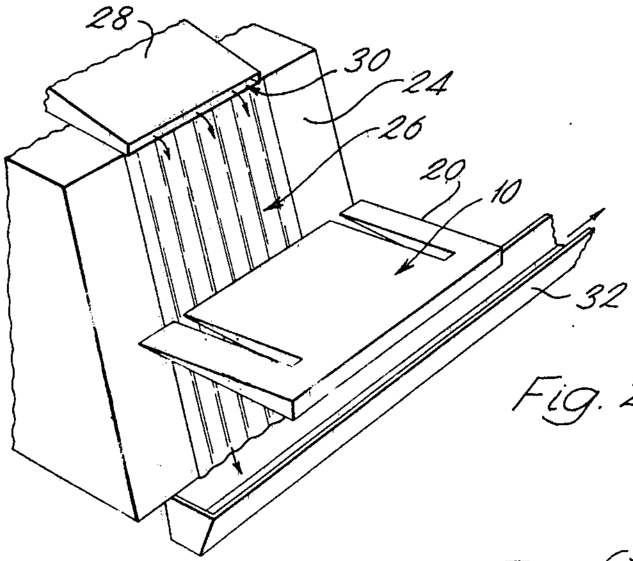
FIG. 2 represents a diagrammatically a form of apparatus for producing emulsion in accordance with the invention.
Figure 3:
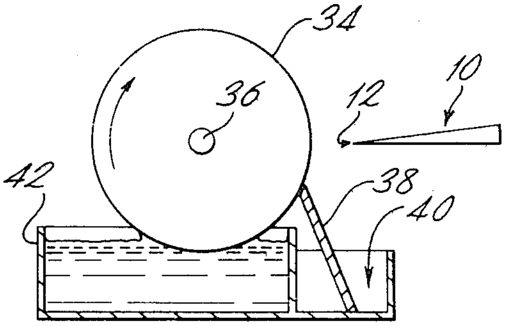
FIG. 3 represents diagrammatically a further form of apparatus for producing emulsions in accordance with the invention.

In an emulsifying process the plate 16 of FIGS. 1*a* and 1*b* is arranged to provide a carrier surface for the continuous phase material in which the atomised disperse phase is to be deposited. FIGS. 2 and 3 show alternative forms of such a carrier. In each case the carrier surface is arranged for the transport of the continuous phase through the deposition region at a predetermined rate.

FIG. 2 shows the simplest arrangement in which the flow rate is controlled by gravity. A generally planar carrier 24 is mounted at an inclination which is variable in accordance with the viscosity of the continuous phase liquid and the required rate of flow, the surface being formed as an array of contiguous shallow channels 26 which run between the top and bottom of the carrier. The material of carrier 24 may be metallic or should otherwise provide surface conductivity to enable the carrier to be connected to earth. Liquid is delivered to the channels 26 from a reservoir (not shown) via a dispenser 28 having a narrow slit 30 (or alternatively a series of jets) arranged transversely of the channels 26 at the top of the carrier 24. An atomiser of the kind shown in FIG. 1 and indicated by the blade 10 is mounted opposite an area of carrier 24 below the dispenser 28 and sufficiently remote from it and from other objects at earth potential to ensure that depositon of atomised disperse phase liquid occurs substantially completely in that area and uniformly across the array of channels 26. The deposited droplets are entrained by liquid flowing down the channels 26 and the resultant emulsion is collected in a transverse channel 32 at the lower edge of carrier 24.

In FIG. 3 a roller 34 provides a carrier surface which is rendered conductive and held at earth potential. Roller 34 is arranged for rotation by means of a drive (not shown) to an axial spindle 36. On its lower face, during a clockwise rotation roller 34 passes over a wiping strip 38 which lies parallel to the roller axis and removes any liquid from the surface. Such liquid is collected in a channel 40. The wiped surface of roller 34 then dips into a trough 42 containing the continuous phase liquid and carries a coating of the liquid into a position where the coating is exposed to a spray of disperse phase droplets from an atomiser blade 10, again forming an emulsion. The emulsified coating is collected in channel 40, the process being continuous once the roller 34 has been wetted. If a greater concentration of the disperse phase is required the contents of channel 40 can of course be recycled through the trough 42. The rate of rotation in the arrangement of FIG. 3 can be made such that very little flow of liquid occurs over the surface of roller 34 and the rate of exposure to the disperse phase droplets is therefore more readily controlled than in the gravity-controlled system of FIG. 2.

It will be apparent that the operation of the wetted moving carrier surface 34 of FIG. 3 can be provided in alternative forms. For example the continuous phase liquid can be applied to the roller surface 34 in spray form instead of by means of the trough 42. In this way the amount of liquid on the surface can be reduced and the concentration of the disperse phase increased. In another alternative the atomiser is operated inside a rotating hollow cylinder the inner face of which is wetted. The process can in this way be protected from contamination and at the same time provides greater safety for the operator. In a further alternative embodiment the carrier surface is no longer rigidly cylindrical but is made from flexible conductive material in an endless belt. The cylindrical and belt forms of surface equally enable multiple atomiser heads to be used in succession as a means of increasing the rate of deposition.

We claim:

1. Apparatus for producing an emulsion of a disperse phase material in a continuous phase material, the material being provided in fluid form, said apparatus comprising:

atomiser electrode means;

means enabling the electrode means to receive a flow of the disperse phase material;

carrier means providing an electrically conductive surface spaced apart from the electrode means;

coating means enabling the conductive surface to receive a coating of the continuous phase material, such that the material forms a thin layer, and means for collecting the emulsion thus formed, the electrode means being effective when raised to a suitable electric potential relative to the conductive surface to cause the formation of atomised droplets of the disperse phase material and the carrier means being so arranged and disposed that the coating of continuous phase material is progressively advanced in a path such that the droplets are entrained by the coating to form an emulsion.

2. Apparatus according to claim 1 in which the conductive surface is stationary and so disposed that the coating is advanced under the influence of gravity.

3. Apparatus according to claim 2 in which the conductive surface is substantially planar.

4. Apparatus according to claim 3 in which the conductive surface is inclined at an angle so related to the viscosity of the continuous phase material that a desired rate of advance is obtained.

5. Apparatus according to claim 1 in which the carrier means is operable to cause unidirectional movement of the conductive surface, the coating being advanced substantially wholly as a result of such movement.

6. Apparatus according to claim 5 in which the carrier means comprises an endless belt.

7. Apparatus according to claim 5 in which the carrier means is of rotatable cylindrical form.

8. Apparatus according to claim 7 in which the conductive surface comprises the external cylindrical face of the carrier means.

9. Apparatus according to claim 7 in which the cylindrical form is hollow and the conductive surface comprises the internal cylindrical face.

10. Apparatus according to claim 5 in which the coating means comprises reservoir means for storage of the coating material and the movement of the conductive surface is arranged to cause immersion of the conductive surface in the coating material 11. Apparatus according to claim 1 in which the coating means comprises means for directing a stream of coating material on to the conductive surface.

12. Apparatus according to claim 1 in which the electrode means comprises at least one electrode having a boundary of small radius of curvature disposed proximately to the conductive surface and so arranged that the flow of disperse phase material is directed towards the boundary.

13. Apparatus according to claim 12 in which each electrode comprises a sharp-edged blade, the edge being disposed to lie parallel to the conductive surface in a plane normal to the direction of advance of the coating.

14. Apparatus according to claim 1 including means for controlling the relative values of the rate of flow of the disperse phase material and the potential of the electrode such that a desired droplet size is obtained.

15. Apparatus according to claim 1 including means for controlling the relative values of the rate of flow of the disperse phase material and the rate of advance of the coating of continuous phase material such that a desired concentration of the emulsion is obtained.

* * * * *